United States Patent
Li et al.

(10) Patent No.: US 8,352,241 B2
(45) Date of Patent: Jan. 8, 2013

(54) EMULATING LEGACY HARDWARE USING IEEE 754 COMPLIANT HARDWARE

(75) Inventors: Jinyu Li, Redmond, WA (US); Ke Deng, Redmond, WA (US); Chen Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/393,215

(22) Filed: Feb. 26, 2009

(65) Prior Publication Data
US 2010/0217579 A1 Aug. 26, 2010

(51) Int. Cl.
*G06F 9/455* (2006.01)
(52) U.S. Cl. ............ 703/26; 703/23
(58) Field of Classification Search .......... 703/23, 703/26–27
See application file for complete search history.

(56) References Cited

U.S. PATENT DOCUMENTS

| | | | |
|---|---|---|---|
| 5,053,987 A | 10/1991 | Genusov et al. | |
| 6,044,454 A | 3/2000 | Schwarz et al. | |
| 6,189,094 B1 | 2/2001 | Hinds et al. | |
| 6,677,951 B2 * | 1/2004 | Yutaka et al. | 345/504 |
| 7,240,184 B2 | 7/2007 | Siu et al. | |
| 7,355,603 B2 | 4/2008 | Donovan et al. | |
| 7,373,489 B1 | 5/2008 | Brooks et al. | |
| 8,035,648 B1 * | 10/2011 | Wloka et al. | 345/531 |

OTHER PUBLICATIONS

Abbott, et al., "Architecture and Software Support in IBM S/390 Parallel Enterprise Servers for IEEE Floating-Point Arithmetic", retrieved on Jan. 5, 2009 at <<http://www.research.ibm.com/journal/rd/435/abbott.html>>, IBM Journal of Research and Development, vol. 43, Nos. 5/6, 1999, 37 pages.

Darcy, "Borneo 1.0.2: Adding IEEE 754 Floating Point Support to Java", retrieved on Jan. 5, 2009 at <<http://www.sonic.net/~jddarcy/Borneo/Postscript/borneo.pdf>>, revised version of a M.S. Project submitted to the Computer Science Division, University of California, Berkeley, May 22, 1998, 139 pages.

"VFP10 Vector Floating-Point Coprocessor", retrieved on Jan. 5, 2009 at <<http://infocenter.arm.com/help/topic/com.arm.doc.ddi0133a/DDI0133.pdf>>, Technical Reference Manual, Feb. 2000, ARM Limited, 82 pages.

* cited by examiner

*Primary Examiner* — Eunhee Kim
(74) *Attorney, Agent, or Firm* — Lee & Hayes, PLLC

(57) ABSTRACT

Emulating legacy hardware using IEEE 754 compliant hardware is disclosed herein. In some aspects, the emulation includes locating an instruction that includes NaN (not a number) as at least one of an operand or a resultant. The emulation adjusts the resultant of the instruction, via additional code, to produce a final resultant of non-compliant (legacy) hardware. Legacy software, which was written in anticipation of processing by legacy hardware, may then be processed using compliant hardware.

19 Claims, 3 Drawing Sheets

EMULATING LEGACY HARDWARE USING IEEE 754 COMPLIANT HARDWARE

BACKGROUND

Computing devices, software, and peripheries often have an associated "lifespan" due to continuous innovations in these respective technologies. Moore's law describes the rapid innovation in the computer hardware industry that has enabled placement of approximately twice the number of transistors on an integrated circuit every two years. Besides just improvements in integrated circuits, there have also been major advances in memory capacity, processing speed, and many other metrics that follow Moore's law. Because of this rapid development of hardware, many other related items, such as software and standards (e.g., IEEE, etc.) continue to evolve at an equivalent pace.

One recent update to a standard that may impact future development of graphics processing units (GPU) is the IEEE 754 standard for Floating-Point Arithmetic. The IEEE 754 standard governs arithmetic for hardware and many computer languages, which are used to develop software to run on the IEEE 754 compliant hardware. The hardware may be integrated in many different types of computing devices such as gaming consoles, personal computers, mobile telephones, and so forth. The software may include video games, productivity applications, operating systems, etc. In 2008, the IEEE 754 was revised, likely impacting compatibility of new GPUs with legacy software.

For example, software that was developed for a processor having a first operating policy (hardware circuitry logic) may not be compatible with a new computing device that employs a newer operating policy that reflects changes due to the changes in the IEEE 754 standards. One option to make legacy software compatible with new GPUs is to modify the software by rewriting portions of the software code to conform to the new IEEE 754 standards. However, some legacy software is only available in binary code while other software may require many time consuming modifications to make the software compatible with the IEEE 754 standards. Thus, modifying the software code may be tedious, time consuming, and expensive.

SUMMARY

Emulating legacy hardware using IEEE 754 compliant hardware is disclosed herein. In some aspects, the emulation includes locating an instruction that includes NaN (not a number) as at least one of an operand or a resultant. The emulation adjusts the resultant of the instruction to produce a final resultant in conformance with non-compliant (legacy) hardware. The emulation's adjustment may or may not be implemented via additional code. Legacy software, which was designed in anticipation of processing by legacy hardware, may then be processed using compliant hardware.

In further aspects, emulating non-compliant hardware may be performed by locating multiplication operations that may involve NaN and zero. The multiplication operations may be modified such as by reassigning values of operands or a resultant to produce a final resultant of zero for a product of NaN and zero.

In still further aspects, emulating non-compliant hardware may be performed by locating transcendental functions that create resultants of NaN and/or INF, and then assigning the resultant a value of zero. This may remove NaN and/or INF from subsequent multiplication operations involving zero, and thus properly emulate resultants of the subsequent operations.

This summary is provided to introduce simplified concepts of emulating legacy hardware using IEEE 754 complaint hardware, which is further described below in the Detailed Description. This summary is not intended to identify essential features of the claimed subject matter, nor is it intended for use in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The same reference number in different figures refers to similar or identical items.

DETAILED DESCRIPTION

Overview

The embodiments described herein may enable legacy software to be used on computing hardware that is compliant with various versions of the IEE 754 standard for hardware and software, particularly as revised in 2008. In particular, some legacy computing devices (e.g., GPUs, CPUs, etc.) implemented floating point arithmetic in a way which is not compliant to the IEEE 754 standard. As a result, legacy software that was written in accordance with protocols for legacy computing hardware may incur conflicts (e.g., unanticipated outputs, etc.) when the legacy software is executed using non-legacy computing hardware (compliant hardware).

For example, a typical distinction between current and legacy operating protocol includes how computing hardware (e.g., central processing unit (CPU), graphics processing unit (GPU), etc.) computes a product of zero multiplied by another operand. Legacy hardware generated a resultant of zero under prior (legacy) IEEE standards, even when an operand was NaN (not a number). Under a revised (non-legacy) IEEE 754 standard (e.g., IEEE 754-2008), the product of NaN and zero generates a resultant of NaN rather than zero. This revision may be advantageous to maintain useful data (e.g., NaN, signaling NaNs, or other data associated with NaN) rather than converting it to zero, but creates problems when processing legacy software that was written with the assumption that the product of NaN and zero would create a resultant of zero. Accordingly, the revision imposes difficulty when porting legacy games or graphics applications for use with compliant computing hardware.

Under IEEE 754, NaN and INF (infinity) are maintained as separate floating point numbers. Two types of NaN are defined and include a quiet NaN and signaling NaN. In addition, two infinities, positive infinity and negative infinity are defined. NaN and INF typically occur as a result of a calculation, which later may be used as an operand for a subsequent calculation. More complex operations, such as a dot product (DOT operation) may include multiple sub-equations, which may generate a NaN that may then be used in a multiplication by zero calculation.

Emulating legacy hardware using IEEE 754 compliant hardware is disclosed herein. In some embodiments, to emulate the anticipated result of zero for a multiplication operation involving NaN and zero on a revised IEEE 754 standard GPU (compliant GPU), the operands and/or resultants of computing operations may be preemptively modified to emulate the behavior of a prior IEEE standard GPU (non-compliant GPU).

Illustrative System

Figure 1:
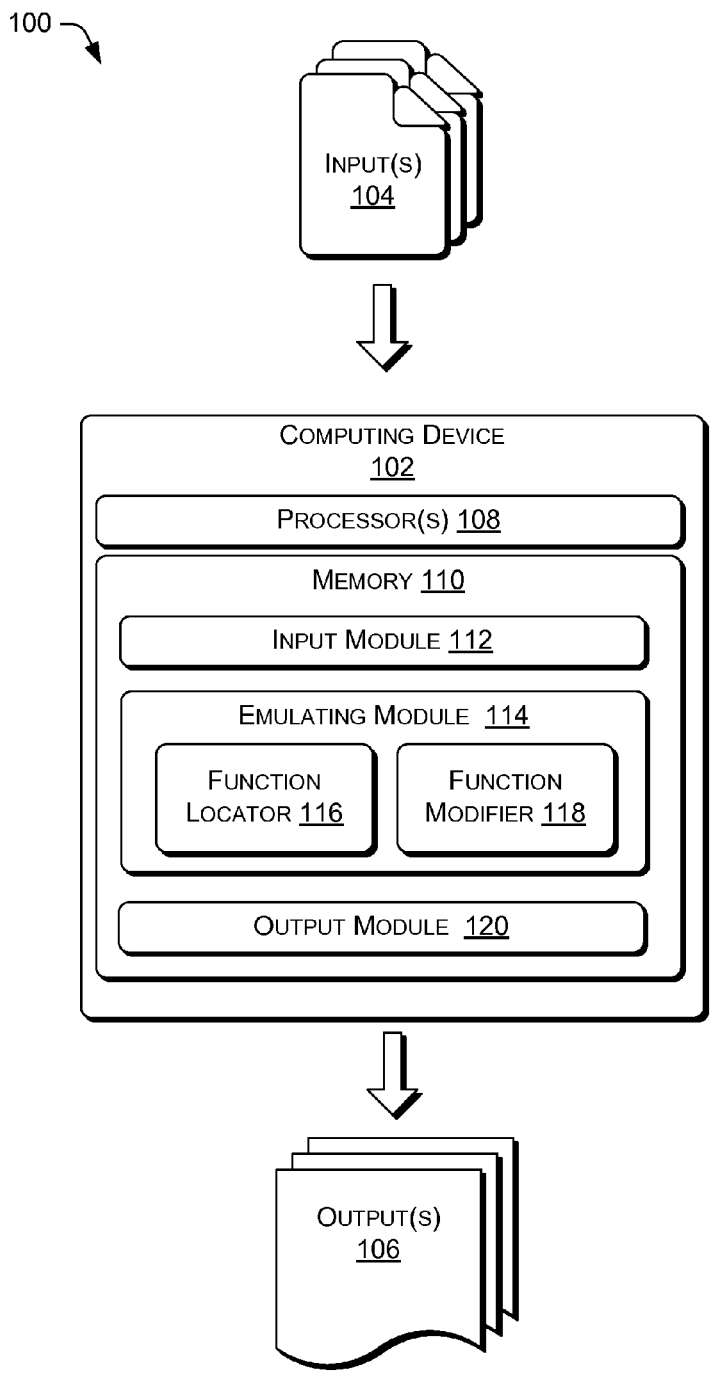
FIG. 1 is a block diagram of an illustrative computing environment that may be used to implement one or more embodiments of emulating legacy hardware using IEEE 754 compliant hardware.

FIG. 1 shows a system 100 illustrating exemplary components of a hardware emulating computing device 102. The computing device 102 may be configured to accept input(s) 104 for processing, manipulation, etc., and generate output(s) 106 as desired by a user of the computing device.

The input(s) 104 may include legacy software that is written for processing by non-compliant hardware which may include, without limitation, a resultant of zero for the product of the operands of zero and NaN. For example, the inputs(s) 104 may be legacy gaming software, legacy applications, legacy operating system, or other software, which may or may not be expressed in the form of binary code.

The computing device 102 may process, manipulate, etc., the input(s) 104 to generate output(s) 106 as initially intended by developers of the inputs (legacy software, etc.). In some embodiments, the output(s) 106 include graphics displays such as graphics for a video game console, a personal computer, a mobile telephone, and so forth.

The computing device 102 may include one or more processors 108 and a memory 110. The processors 108 are compliant hardware such that they perform operations (calculations, etc.) in accordance with current IEEE 754 standards. As disclosed herein, the current IEEE 754 standards refer to IEEE 754-2008, which is the 2008 revision to these IEEE standards. The memory 110 may include volatile and/or non-volatile memory, removable and non-removable media implemented in any method or technology for storage of information, such as computer-readable instructions, data structures, program modules or other data. Such memory may include, but is not limited to, random access memory (RAM), read-only memory (ROM), Electrically erasable programmable read-only Memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 110 of the computing device 102 may store a number of components such as an input module 112, an emulating module 114, and an output module 120, among other possible components.

The input module 112 may be configured to receive the input(s) 104 for the computing device 102. The input module 112 may receive code from legacy software, which is requested to be processed by the computing device. For example, a user may cause the computing device 102 to load legacy software to create the output(s) 106.

The emulating module 114 may use the input(s) 104 that are received by the input module 112 to emulate non-compliant hardware processing by hardware (e.g., the processors 108, etc.) that is complaint with most recent IEEE 754 standard. The emulating module 114 may include a function locator 116 and a function modifier 118 to enable the emulation.

The function locator 116 may locate functions (e.g., calculations, instructions, operations, etc.) that generate a resultant that may be affected by a non-compliant input (i.e., legacy software code) 104. The non-compliant input occurs in legacy software that was written in anticipation of being processed by hardware described as "legacy hardware" herein, thus not being compliant with the current IEEE 754 standards. In some embodiments, the function locator 116 may locate functions that include multiplication of NaN and zero. In various embodiments, the function locator 116 may locate resultants of calculations that produce a resultant of NaN or zero. These resultants may be used as inputs for future calculations that ultimately include a multiplication operation of operands including NaN and zero. An unanticipated resultant (NaN) may then be generated when the compliant hardware does not emulate non-compliant processing, as disclosed herein.

The function modifier 118 may modify the processing of the function to achieve a resultant that would be generated by non-compliant hardware. For example, a resultant of NaN from a multiplication operation involving the operands NaN and zero may be modified (assigned) to be zero to emulate non-compliant hardware processing of the multiplication operation.

Finally, the output module 120 may present the emulated input to another mechanism such as a display for viewing by a human viewer. For example, the output module 120 may be an anticipated output of a graphical display of legacy software that was intended to be processed by non-compliant hardware.

Illustrative Operations

Figure 2:
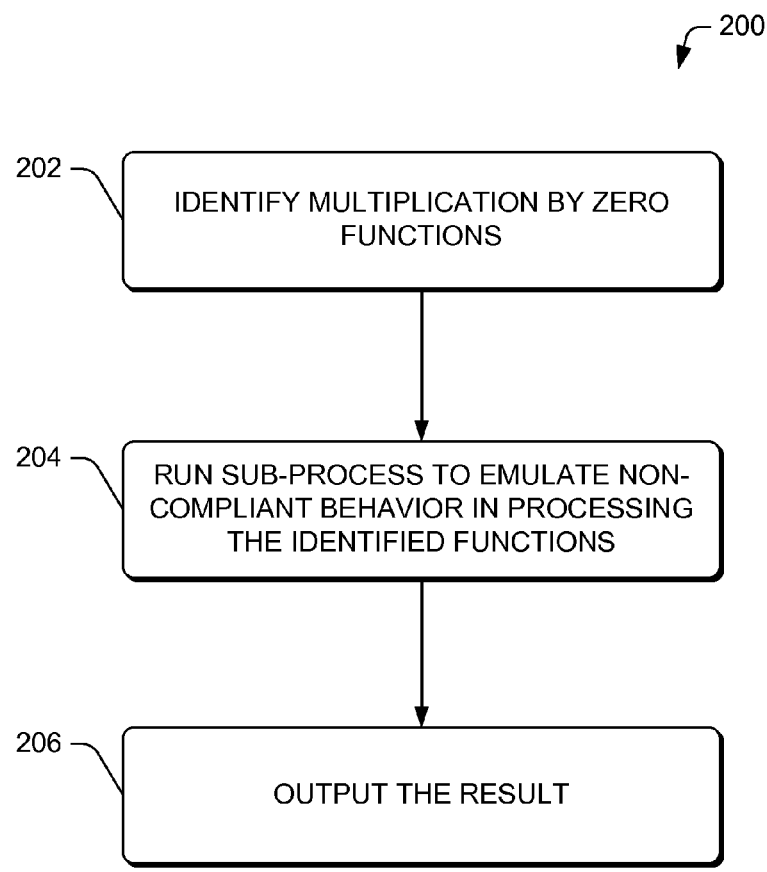
FIG. 2 shows a flow diagram of an illustrative process of emulating legacy hardware using a direct method to modify multiplication-based functions to generate a legacy resultant in accordance with some embodiments of the disclosure.

FIG. 2 shows a flow diagram of an illustrative process 200 of emulating a legacy GPU using a direct method to modify multiplication-based functions to generate a legacy resultant in accordance with some embodiments of the disclosure. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

Generally speaking, the process 200 describes a direct technique to identify instances in which multiplication of NaN and zero occur. Thus, the direct technique checks each multiplication instance and makes any necessary adjustments to emulate the behavior of legacy hardware (e.g., non-compliant GPU, etc.).

At 202, the computing device 102 may identify multiplication by zero instructions. These instructions may include, without limitation, MUL (multiply), MAD (multiply and add), DOT (dot product), etc. The multiplication functions may be identified by the function locator 116.

At 204, a sub-process may be performed by the computing device 102 to emulate a non-compliant hardware processing in the identified instructions at 202. In some embodiments, the direct technique for emulation is performed by additional code having instructions to locate situations in which NaN and zero may be multiplied before each multiplication related instruction occurs. When a multiplication instruction is identified at 202, the operands of multiplication instructions are analyzed to determine if any include the value of zero. If any operand is zero, then the resultant may be set to zero to emulate the resultant produced by non-compliant hardware. In other embodiments, the other operands may be set to zero. In this manner, the outcome of the multiplication instruction will be zero because any possible instances of NaN would be replaced with the value of zero.

An example instruction of MUL may include multiplying two operands. In some instances, the operands may include zero and NaN. Using the direct technique, each operand in the MUL instruction may be inspected to determine if an operand is zero. Upon detection of an operand of zero, the resultant may be set to zero. This resultant would emulate non-compliant hardware, which generates a resultant of zero for multiplication (MUL) of NaN and zero, while compliant hardware, without additional code, would generate a resultant of NaN for the same MUL instruction.

In another example, a DOT instruction may be located at 202 and is shown in equation 1.

$$z = \text{dot}(x, y) \quad \text{Equation (1)}$$

The instruction of Equation 1 is a dot product that includes both multiplication and addition instructions inherent in vector operations. It is possible that one of the vectors is NaN and a corresponding vector (the vector that will be multiplied by NaN) may have the value of zero. In such an instance, the resultant or the operands may be set to zero to properly emulate non-compliant hardware processing of the instruction.

In some embodiments, at 204, the following types of sub-processes may be implemented to emulate non-compliant hardware processing. However, this example only illustrates one of many similar techniques that may be used to properly emulate the non-compliant hardware processing that generates a resultant of zero during a multiplication operation of NaN and zero.

TABLE 1

| | |
|---|---|
| 1 | y.rgba = (x.rgba == 0 ? 0 : y); |
| 2 | x.rgba = (y.rgba == 0 ? 0 : x); |
| 3 | z = dot(x, y) |

In Table 1, line 1 replaces each component of the y-vector (y.rgba) with a zero if the corresponding component of the x-vector (x.rgba) is zero. In this way, each multiplication instruction that involves zero (even those with NaN) produce an intermediate resultant of zero, as predicted during processing by non-compliant hardware.

Finally, at 206, the resultant of the instruction is output. The output may be generated by the output module 120, which may create the outputs 106 for display. For example, the output may be a proper rendering of legacy software using hardware that is compliant to recent IEEE 754 standards when the legacy software was intended to be processed by non-compliant hardware.

Some general observations about the direct method include the use of two additional sub-process at 204 may be necessary to emulate the processing of non-compliant hardware. In addition, the operation 204 may have to occur relatively frequently because the operation 204 occurs for each multiplication operation. During a rendering of a single frame of a graphics (e.g., in a 3D rendering, etc.) hundreds or thousands of multiplication operations may occur. Thus, the direct technique may add significant processing requirements (e.g., instructions, time, etc.) to graphics processing (or other types of processing) because multiplication related instructions are commonly used.

However, one benefit of the direct technique is its straightforward approach to identifying each multiplication process. Further, because legacy software is often written to be processed by hardware (CPU, GPU, etc.) available at the time of the software development, improved hardware that is compliant with current IEEE 754 standards may be capable of performing the additional sub-processes without adverse or noticeable effects.

Figure 3:
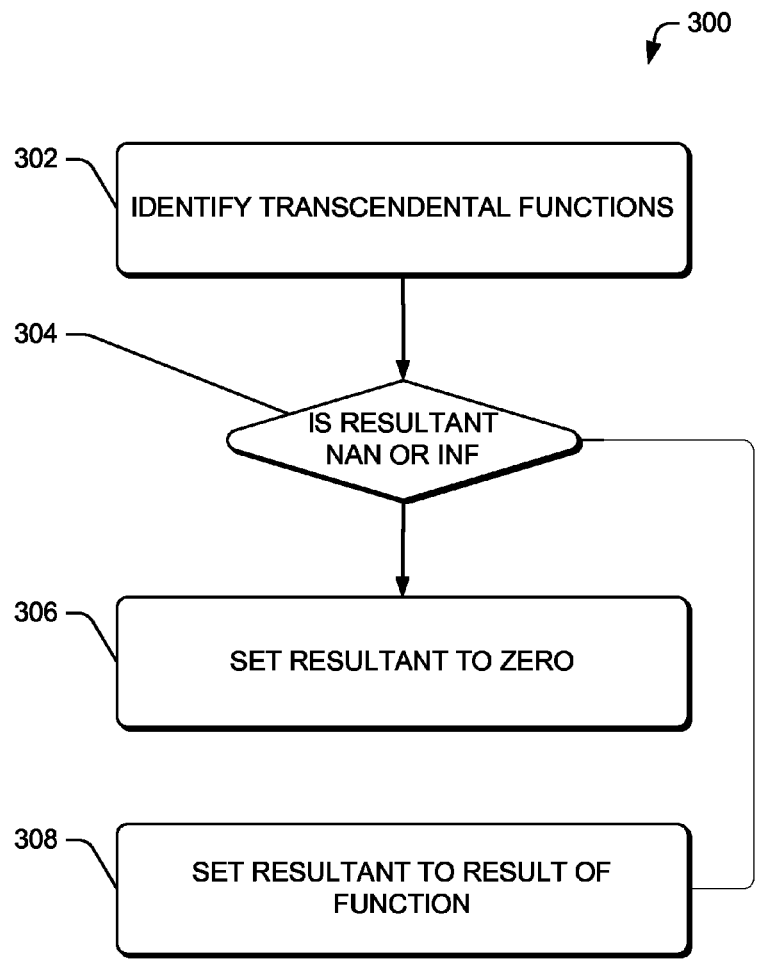
FIG. 3 shows a flow diagram of an illustrative process of emulating legacy hardware by modifying resultants of transcendental equations to enable generating legacy resultants in subsequent calculations in accordance with some embodiments of the disclosure.

FIG. 3 shows a flow diagram of an illustrative process 300 of emulating a legacy GPU by modifying a resultant of a transcendental equation to enable generating a legacy resultant in subsequent calculations in accordance with some embodiments of the disclosure.

At 302, the computing device 102 may identify transcendental functions. The transcendental functions include functions (calculations, instructions, operations, etc.) that may produce a number that is not a root of an algebraic equation having integer coefficients; in other words, equations that may generate NaN or INF as a resultant from operands that may not include NaN or INF. For example, the square root of a negative number results in NaN. In another example, any number divided by zero results in INF. These are examples of transcendental functions, which may be identified at 302.

When a graphics application generates an intermediate resultant of NaN in the middle of a shader process, a final resultant of further processing may be NaN or may not be NaN. Analysis of legacy hardware processing has determined two principles. First, if the final resultant is not NaN, then the intermediate resultant of NaN may have been removed following multiplication against zero. In these instances, converting the NaN to zero prior to the multiplication would generate the same resultant, which is zero.

Second, the final resultant of the shader may be NaN. Most legacy hardware (e.g., legacy GPU, etc.) display NaN as the color black, which is same color that is displayed for the resultant of zero. This enables converting the NaN to zero without modifying the color displayed by the legacy hardware. In some situations, NaN may be replaced by zero, but the final resultant using legacy hardware would have been NaN, such as when no multiply by zero occurs in the function involving NaN. In such an instance, the final display would still be the color black because both zero and NaN are displayed as the color black. Accordingly, emulating legacy hardware that is non-compliant with current IEEE standards may be achieved by locating resultants of NaN or INF of the transcendental functions identified at 302 as described below.

At 304, the computing device 102 determines whether the resultant is NaN or INF.

At 306, the result is set to zero when the resultant of the transcendental function is determined to be NaN or INF at 304. As discussed above, this does not affect the final display of the legacy hardware during the shading process because of the two observations regarding non-compliant processing of legacy software.

At 308, the resultant of the function is not modified when the resultant of the transcendental function is neither NaN nor INF. In other words, the function of the resultant is maintained and not set to zero.

During the process 300, transcendental functions may be categorized into three different types, each discussed below. A "Type I" transcendental function is limited to a resultant of NaN and does not result in INF. For example, the square root of a negative number generates NaN, but cannot generate INF. Equation 2 is an example of a Type I transcendental function.

$$y=\text{sqrt}(x) \quad \text{Equation (2)}$$

To execute Equation 2 as described in the process 300, additional code may be implemented to determine whether the outcome of the transcendental function is NaN. Illustrative code is provided in Table 2.

TABLE 2

| 1 | y = sqrt(x); |
|---|---|
| 2 | if (isNaN(y)) y = 0; |

As shown in Table 2, line 1 includes the transcendental function. Line 2 determines if the transcendental function results in NaN, and if it does, the code sets the resultant of the transcendental function to zero.

A "Type II" transcendental function is limited to a resultant of INF and cannot result in NaN. For example, the reciprocal of zero generates INF, but cannot generate NaN. Equation 3 is an example of a Type II transcendental function.

$$y=\text{rcp}(x) \quad \text{Equation (3)}$$

To execute Equation 3 as described in the process 300, additional code may be implemented to determine whether the outcome of the transcendental function is INF. Illustrative code is provided in Table 3.

TABLE 3

| 1 | y = rcp(x); |
|---|---|
| 2 | if (isINF(y)) y = 0; |

As shown in Table 3, line 1 includes the transcendental function. Line 2 determines if the transcendental function results in INF, and if it does, the code sets the resultant of the transcendental function to zero.

A "Type III" transcendental function may generate a resultant of NaN or INF. For example, the logarithm of a number may generate NaN or INF. Equation 4 is an example of a Type III transcendental function.

$$y=\log(x) \quad \text{Equation (4)}$$

To execute Equation 4 as described in the process 300, additional code may be implemented to determine whether the outcome of the transcendental function is NaN or INF. Illustrative code is provided in Table 4.

TABLE 4

| 1 | y = log(x); |
|---|---|
| 2 | if (isNaN(y)\|\|isINF(y)) y = 0; |

As shown in Table 4, line 1 includes the transcendental function. Line 2 determines if the transcendental function results in NaN or INF, and if it does, the code sets the resultant of the transcendental function to zero.

One advantage of the process 300 may be the relatively infrequent occurrence of transcendental functions as compared to multiplication instructions, which are identified and analyzed in the process 200. Thus, the process 300 may require less processing requirements because of the infrequency of transcendental functions. In addition, only a second line of code (line 2 in the Tables 2-4) may be used to remove NaN or INF occurrences and thus enable emulation of non-compliant hardware using compliant hardware related to IEEE 754.

Although the disclosure describes two detailed approaches to emulating non-compliant hardware using compliant hardware to properly process legacy software to achieve an intended output, other approaches are within the scope of the disclosure. For example, additional lines of code may be implemented that check every instruction and replace NaN with zero. In addition, only selected functions and instructions are discussed herein for illustrative purposes, while other functions and instructions that are similar are also within the scope of the disclosure.

Conclusion

The above-described techniques pertain to emulating legacy hardware using IEEE 754 compliant hardware. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of emulating hardware execution of software, the method comprising:
    locating a multiplication instruction of the software, wherein operands of the multiplication instruction include NaN (not a number) and INF (infinity); and
    emulating, with a standard-compliant hardware, a non-standard compliant hardware processing of the instruction including assigning a value of zero to at least one of an operand or a resultant, such that zero is the resultant of the multiplication instruction.

2. The method of claim 1, wherein the standard-compliant hardware is compliant with a version of IEEE 754 standard, and the non-standard compliant hardware processing is compliant with another version of the IEEE 754 standard.

3. A method of emulating hardware execution of software, the method comprising:
    locating an instruction of the software that includes a transcendental function; and
    emulating a non-standards compliant hardware processing of the instruction, including:
        determining that a standards-compliant hardware processing of the transcendental function results in a resultant of NaN (not a number) or INF (infinity); and
        assigning the resultant of the transcendental function a value of zero upon a determination that the resultant is NaN or INF.

4. The method of claim 3, wherein the hardware that performs the standards-compliant hardware processing is a graphics processing unit (GPU).

5. The method of claim 3, further comprising outputting the resultant of the emulated instruction as a graphical display on a display device.

6. One or more computer-readable storage media storing computer-executable instructions that are executable by one or more processors to performs acts comprising:
    emulating hardware that is compliant with a version of IEEE 754 standard to process software using hardware that is compliant with another version of IEEE standard, the emulating including:
        identifying a transcendental function of the software;
        determining that hardware processing of the transcendental function by the hardware that is compliant with another version of IEEE standard results in a resultant of NaN (not a number); and assigning the resultant of the transcendental function to zero upon a determination that the resultant of the transcendental function is NaN.

7. The one or more computer-readable storage media as recited in claim 6, wherein the acts further include:
determining that the hardware processing of another transcendental function by the hardware that is compliant with another version of IEEE standard results in a resultant of INF (infinity); and
assigning the resultant of the transcendental function to zero upon a determination that the resultant of the transcendental function is INF.

8. The one or more computer-readable storage media as recited in claim 6, wherein the identifying the transcendental function includes:
identifying a first type of transcendental function that generates NaN and does not generate INF (infinity), wherein the first type includes a line of code to set the resultant to zero when the resultant of the transcendental function is NaN; and
identifying a second type of transcendental function that generates INF and does not generate NaN, wherein the second type includes a line of code to set the resultant to zero when the resultant of the transcendental function is INF.

9. The one or more computer-readable storage media as recited in claim 8, wherein identifying a transcendental function further includes identifying a third type of transcendental function that generates NaN or INF, wherein the third type includes a line of code to set the resultant to zero when the resultant of the transcendental function is NaN or INF.

10. The one or more computer-readable storage media as recited in claim 6, further comprising outputting the resultant to a display device.

11. The one or more computer-readable storage media as recited in claim 6, wherein the transcendental function includes at least one of a logarithm function, a root function, or an inverse function.

12. The one or more computer-readable storage media as recited in claim 6, wherein the standard-compliant hardware includes a graphics processing unit (GPU).

13. The one or more computer-readable storage media as recited in claim 6, wherein the software includes code that anticipates by design that multiplication of NaN and zero will generate a resultant of zero.

14. One or more computer-readable storage media comprising computer-executable instructions that are executable by one or more processors of a computing system to performs acts comprising:
identifying a multiplication instruction;
determining that one of the operands in the multiplication instruction is zero; and
emulating hardware that is compliant with a first version of IEEE 754 standard using hardware that is compliant with a second version of IEEE 754 standard to process software by creating a resultant of zero upon a determination that an operand in the multiplication instruction is zero.

15. The one or more computer-readable storage media as recited in claim 14, wherein the acts further comprise assigning at least one other operand in the multiplication instruction to zero upon a determination that the operand is zero.

16. The one or more computer-readable storage media as recited in claim 14, wherein the hardware that is compliant with a second version of IEEE 754 standard is at least one of a central processing unit (CPU) or a graphics processing unit (GPU).

17. The one or more computer-readable storage media as recited in claim 16, wherein the acts further comprise outputting the resultant to a display device.

18. The one or more computer-readable storage media as recited in claim 17, wherein the multiplication instruction includes at least one of a MUL (multiply), MAD (multiply and add), or DOT (dot product).

19. The one or more computer-readable storage media as recited in claim 14, wherein the software includes code that anticipates by design that multiplication of NaN and zero will generate a resultant of zero.

\* \* \* \* \*